United States Patent
Wilcox et al.

(10) Patent No.: US 11,748,534 B1
(45) Date of Patent: Sep. 5, 2023

(54) SYSTEM AND METHOD FOR GLITCH POWER ESTIMATION

(71) Applicant: Cadence Design Systems, Inc., San Jose, CA (US)

(72) Inventors: Steev Wilcox, San Jose, CA (US); Daniel Fernandes, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/572,836

(22) Filed: Jan. 11, 2022

(51) Int. Cl.
*G06F 30/323* (2020.01)
*G06F 111/20* (2020.01)
*G06F 111/08* (2020.01)
*G06F 119/06* (2020.01)

(52) U.S. Cl.
CPC ........ *G06F 30/323* (2020.01); *G06F 2111/08* (2020.01); *G06F 2111/20* (2020.01); *G06F 2119/06* (2020.01)

(58) Field of Classification Search
CPC .......... G06F 30/323; G06F 2111/08; G06F 2111/20; G06F 2119/06
See application file for complete search history.

(56) References Cited

U.S. PATENT DOCUMENTS

| | | | |
|---|---|---|---|
| 7,222,039 B2 | 5/2007 | Wilcox et al. | |
| 7,539,958 B2 | 5/2009 | Wilcox et al. | |
| 7,630,851 B2 | 12/2009 | Wilcox et al. | |
| 10,302,698 B1* | 5/2019 | Zhang | G01R 31/3177 |
| 10,726,179 B1* | 7/2020 | Dose | G06F 30/33 |
| 10,885,248 B1* | 1/2021 | Sotiropoulos | G06F 30/367 |
| 11,461,523 B1* | 10/2022 | Chen | G06F 30/3312 |
| 2007/0022395 A1* | 1/2007 | Ravi | G06F 30/33 703/16 |
| 2009/0119037 A1* | 5/2009 | Khalil | G06F 30/367 702/181 |
| 2012/0266120 A1* | 10/2012 | Buechner | G06F 30/327 716/109 |
| 2019/0138677 A1* | 5/2019 | Peng | G06F 30/327 |
| 2021/0279392 A1* | 9/2021 | Banerjee | G06F 30/337 |
| 2021/0384901 A1* | 12/2021 | Bai | H03K 17/687 |
| 2021/0406438 A1* | 12/2021 | Jain | G06F 30/3312 |

* cited by examiner

*Primary Examiner* — Nha T Nguyen
(74) *Attorney, Agent, or Firm* — Mark H. Whittenberger; Holland & Knight, LLP

(57) ABSTRACT

Embodiments include herein are directed towards a system and method for estimating glitch power associated with an emulation process is provided. Embodiments may include accessing, using a processor, information associated with an electronic design database and generating cycle accurate waveform information at each node of a netlist based upon, at least in part, a portion of the electronic design database. Embodiments may further include generating a probability-based model for a plurality of inputs associated with the netlist and determining one or more partial glitch transitions from each probability-based model. Embodiments may also include combining the one or more partial glitch transitions with the cycle accurate waveform information to obtain a glitch power estimation.

18 Claims, 10 Drawing Sheets

10

202 — accessing, using a processor, information associated with an electronic design database

204 — generating cycle accurate waveform information at each node of a netlist based upon, at least in part, a portion of the electronic design database

206 — generating a probability-based model for a plurality of inputs associated with the netlist

208 — determining one or more partial glitch transitions from each probability-based model

210 — combining the one or more partial glitch transitions with the cycle accurate waveform information to obtain a glitch power estimation

FIG. 2

SYSTEM AND METHOD FOR GLITCH POWER ESTIMATION

FIELD OF THE INVENTION

The present disclosure relates to a system and method for use in electronic design, and more particularly, to an glitch power estimation for use in emulation systems.

BACKGROUND

In order to save power, you must first be able to measure power. Dynamic power in application specific integrated circuits ("ASICs") depends on the switching activity, and leakage power depends on the current state of the circuit, so power estimation can be reduced to estimating the chance of switching and the typical level at each node in the circuit. Together, the switching and level information will be called activity information or just activity in this disclosure.

The most obvious way to find out the activity of a circuit is to use a logic simulator, together with a method for creating typical patterns on the top-level inputs, usually a test-bench written in a Register Transfer Language. This has a number of disadvantages. First, it is very time-consuming to create a good test-bench for the circuit. Second, simulation takes a long time. Third, the results are only applicable to the mode of use that the test-bench was created for. Other modes may have very different power signatures, and it is difficult to tell whether a particular test-bench is typical or not.

The main advantage of a simulation approach is that one can guarantee that the circuit has the calculated activity for one particular mode of use, although it is completely unknown whether the calculated activity is representative. To provide a much faster way to determine representative activities, techniques have been developed using stochastic methods. Early approaches were mostly focused on testing circuits rather than power estimation. These approaches did not consider correlations between signals or between the same signal at different times, so they were not accurate for typical circuits.

Electronic Emulation is cycle-accurate in that it determines the state of all nodes in the circuit at the end of the user cycle. Companies have reported for many years that a significant fraction of the power in a chip comes from glitches. A glitch is an edge that transitions more than once per cycle. These are not counted by an emulator. As such, any purely emulation-based approach to measuring power will miss a large fraction of the power (e.g., approximately 20%).

SUMMARY

In one or more embodiments of the present disclosure, a method for estimating glitch power associated with an emulation process is provided. The method may include accessing, using a processor, information associated with an electronic design database and generating cycle accurate waveform information at each node of a netlist based upon, at least in part, a portion of the electronic design database. The method may further include generating a probability-based model for a plurality of inputs associated with the netlist and determining one or more partial glitch transitions from each probability-based model. The method may also include combining the one or more partial glitch transitions with the cycle accurate waveform information to obtain a glitch power estimation.

One or more of the following features may be included. In some embodiments, the method may further include receiving one or more electronic design files. The method may also include generating, a power estimate derived from switching information based upon, at least in part, the one or more electronic design files. Generating the probability-based model may include generating the probability-based model in one or more user specified windows. The one or more partial glitch transitions may be stochastically derived. The method may further include converting at least a portion of the information associated with the electronic design database into one or more output files. The one or more output files may include switching activity information.

In one or more embodiments of the present disclosure, a computer-readable storage medium having instructions for estimating glitch power associated with an emulation process is provided. Some operations may include accessing, using a processor, information associated with an electronic design database and generating cycle accurate waveform information at each node of a netlist based upon, at least in part, a portion of the electronic design database. Operations may further include generating a Markov glitch model for a plurality of inputs associated with the netlist. Operations may also include receiving an electronic design parasitic data file and calculating a power estimate derived from switching information based upon, at least in part, the electronic design parasitic file. Operations may further include determining one or more partial glitch transitions from each Markov glitch model and combining the one or more partial glitch transitions with the cycle accurate waveform information to obtain a glitch power estimation across a plurality of electronic design layouts.

One or more of the following features may be included. In some embodiments, operations may include receiving a plurality of layout electronic design files. The power estimate derived from switching information may be used to obtain a power number for each of a plurality of groups of nets associated with the electronic design. Generating the Markov glitch model may include generating the Markov glitch model in one or more user specified windows. The one or more partial glitch transitions may be stochastically derived. Operations may also include converting at least a portion of the information associated with the electronic design database into one or more output files. The one or more output files may include switching activity information.

In one or more embodiments of the present disclosure, a system for estimating glitch power associated with an emulation process is provided. The system may include an electronic design database and at least one processor configured to access information associated with the electronic design database. The at least one processor may be further configured to generate cycle accurate waveform information at each node of a netlist based upon, at least in part, a portion of the electronic design database. The at least one processor may be further configured to generate a probability-based model for a plurality of inputs associated with the netlist and to determine one or more partial glitch transitions from each probability-based model. The at least one processor may be further configured to combine the one or more partial glitch transitions with the cycle accurate waveform information to obtain a glitch power estimation.

One or more of the following features may be included. In some embodiments, the at least one processor may be further configured to access one or more electronic design files. The at least one processor may be further configured to generate, a power estimate derived from switching information based upon, at least in part, the one or more electronic design files. Generating the probability-based model may include generating the probability-based model in one or more user specified windows. The one or more partial glitch transitions may be stochastically derived. The at least one processor may be further configured to convert at least a portion of the information associated with the electronic design database into one or more output files.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 2 is an exemplary flowchart of an glitch power estimation process according to an embodiment of the present disclosure;

DETAILED DESCRIPTION

Figure 1:
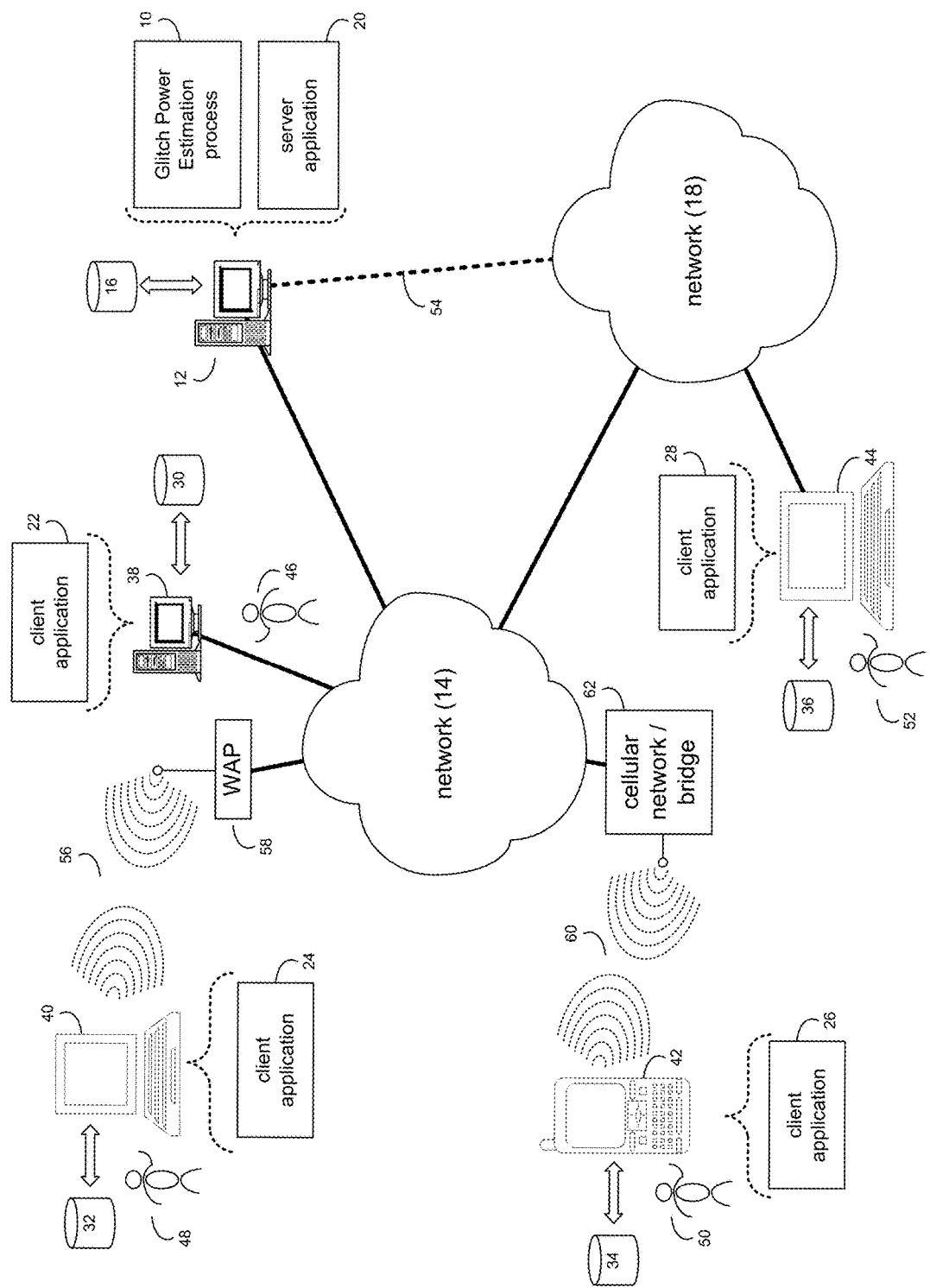
FIG. 1 diagrammatically depicts an glitch power estimation process coupled to a distributed computing network.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. In the drawings, the thicknesses of layers and regions may be exaggerated for clarity. Like reference numerals in the drawings may denote like elements.

Referring to FIG. 1, there is shown an glitch power estimation process 10 that may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Additionally and/or alternatively, glitch power estimation process 10 may reside on a client electronic device, such as a personal computer, notebook computer, personal digital assistant, or the like.

The instruction sets and subroutines of glitch power estimation process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Lotus Domino™ Server and Microsoft Exchange™ Server. Server application 20 may interact with one or more client applications (e.g., client applications 22, 24, 26, 28) in order to execute glitch power estimation process 10. Examples of client applications 22, 24, 26, 28 may include, but are not limited to, design verification tools such as those available from the assignee of the present disclosure. These applications may also be executed by server computer 12. In some embodiments, glitch power estimation process 10 may be a stand-alone application that interfaces with server application 20 or may be an applet/application that is executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the glitch power estimation process may be a client-side application (not shown) residing on one or more client electronic devices 38, 40, 42, 44 (e.g., stored on storage devices 30, 32, 34, 36, respectively). As such, the glitch power estimation process may be a stand-alone application that interfaces with a client application (e.g., client applications 22, 24, 26, 28), or may be an applet/application that is executed within a client application. As such, the glitch power estimation process may be a client-side process, a server-side process, or a hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

In some embodiments, glitch power estimation process 10 may be a cloud-based process as any or all of the operations described herein may occur, in whole, or in part, in the cloud or as part of a cloud-based system. The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, Apple iOS, ANDROID, or a custom operating system.

Referring now to FIG. 2, a flowchart depicting an embodiment consistent with glitch power estimation process 10 is provided. The method may include accessing (202), using a processor, information associated with an electronic design database and generating (204) cycle accurate waveform information at each node of a netlist based upon, at least in part, a portion of the electronic design database. The method may further include generating (206) a probability-based model for a plurality of inputs associated with the netlist and determining (208) one or more partial glitch transitions from each probability-based model. The method may also include combining (210) the one or more partial glitch transitions with the cycle accurate waveform information to obtain a glitch power estimation. Numerous other operations are also within the scope of the present disclosure.

Figure 3:
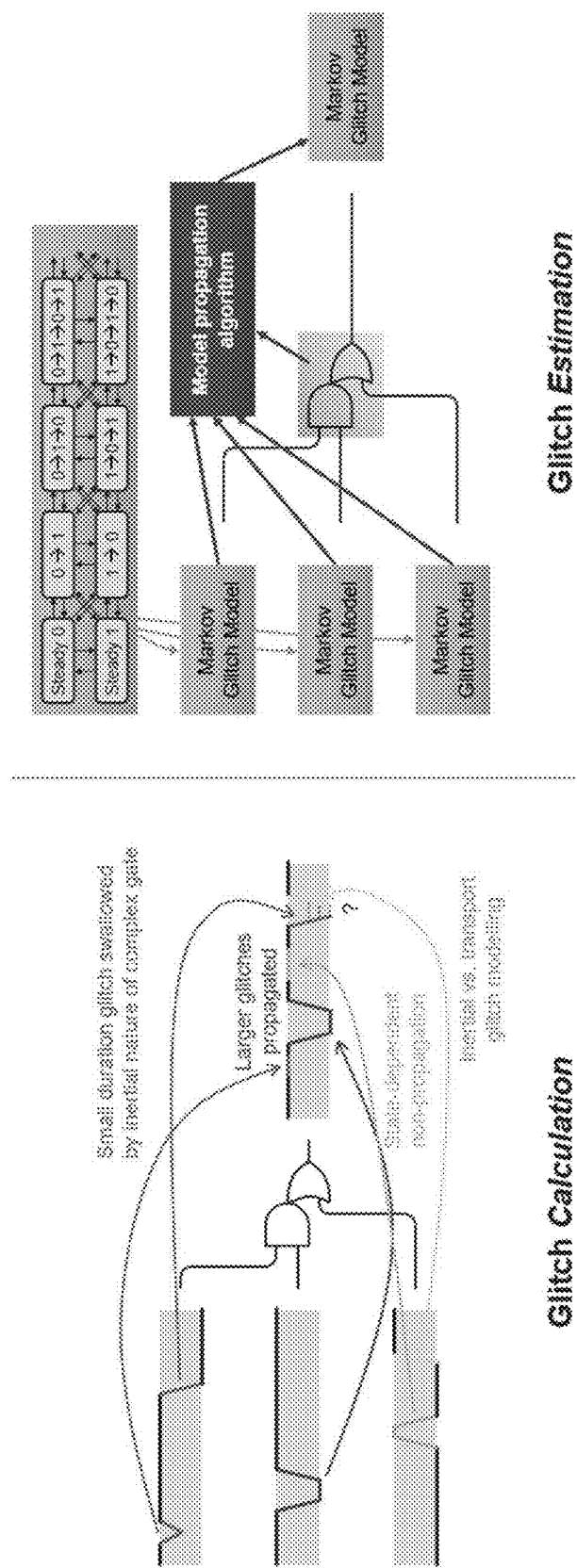
FIG. 3 is a diagram comparing glitch calculation with a glitch estimation process according to an embodiment of the present disclosure.

Referring now to FIG. 3, a diagram 300 showing a comparison of glitch calculation and glitch estimation is provided. As shown in the diagram, glitch calculation may use one or more glitch models to precisely measure glitch power. Some of these may include, but are not limited to, standard delay format ("SDF"), liberty, internal, etc. Glitch calculation tends to be accurate only for exact values of gate delays, process parameters, gate voltage, etc. In contrast, glitch estimation may use stochastic models to estimate glitch power across a variety of representative layouts. Results apply to a wide spread of gate delays from process/voltage/temperature variations.

Figure 4:
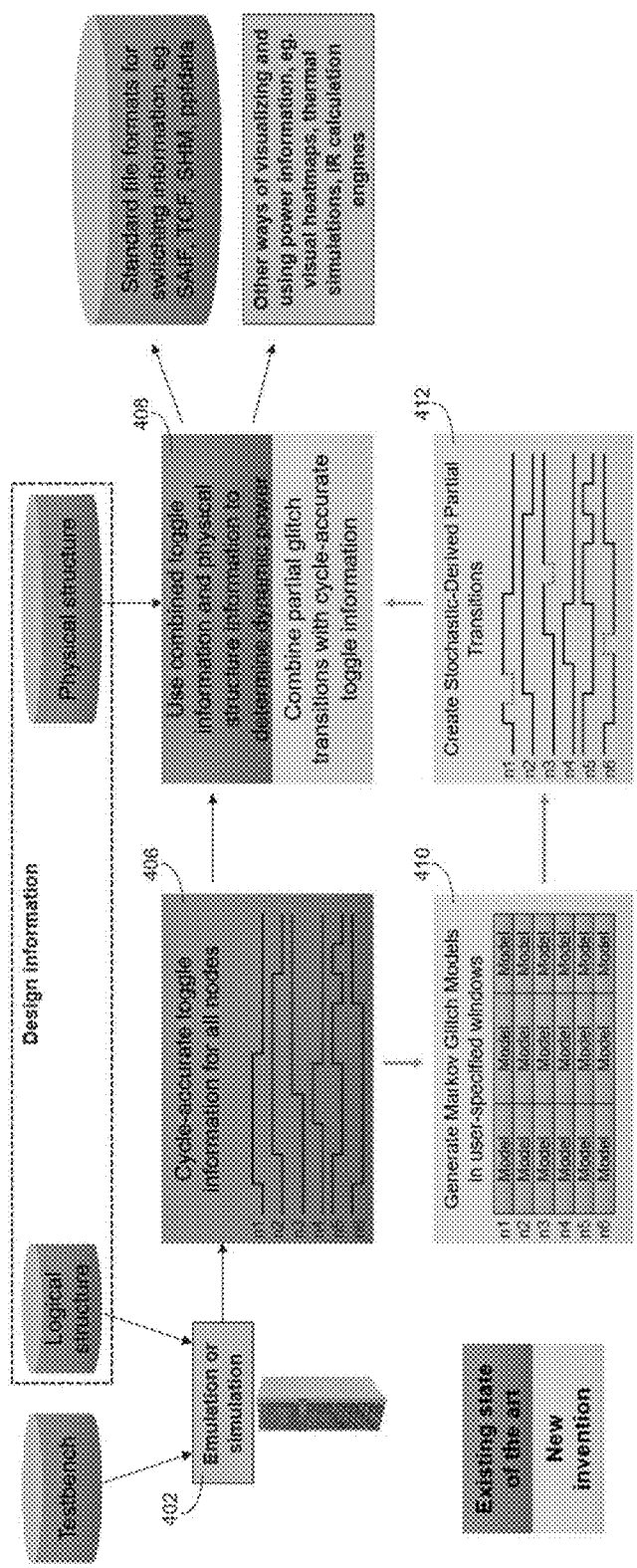
FIG. 4 is a diagram showing an example of a glitch estimation process according to an embodiment of the present disclosure.

Referring now to FIG. 4, a diagram 400 showing an embodiments consistent with glitch power estimation process 10 is provided. Emulator 402 may be configured to perform high performance hardware and software verification and debugging of complex System-on-a-chips ("SoCs") and systems. Numerous emulators may be used without departing from the scope of the present invention including those available from the Assignee of the present disclosure. Emulator 402 may be configured to provide to an offline database the state of all primary inputs to the netlist on all cycles, and all flops (typically) every 32 cycles. This allows for the calculation of the state of all nodes in the design at all times, in the next box. In some embodiments, emulator 402 may act as a cycle-accurate simulator, which means that it may not consider the delays on each individual arc, so it may be unable to determine whether one node switched before another. In a cycle-accurate simulator nothing may switch more than once in a cycle, even if the real netlist would switch multiple times under either a real delay model (e.g., SDF simulation) or unit-delay model (e.g., all gates take the same time to switch). In this way, most emulators on their own, cannot see glitch power, which has been reported as being 20-25% of the total power budget.

In some embodiments, glitch power estimation process 10 may include compute engine 406 that may be configured to access the information stored in offline database and generate cycle-accurate toggle information for all nodes. When provided with the state of all primary (e.g., top-level) inputs on every cycle, and the state of all the flops at the start, glitch power estimation process 10 may be configured to calculate the state of every flop on each subsequent cycle by running a simulation, which may be time-consuming.

In some embodiments, compute engine 406 may be configured to turn the offline database into files that may be used by other tools. One example of an output file is a Switching Activity Interchange Format ("SAIF") file. This is a cross-company standard, but only provides switching (e.g., identifying 10 edges in a period, etc.) information and no waveform data. Waveform files also exist such as Value Change Dump ("VCD"). These files may be extremely large, as they provide all edges of all nets. Some other file types may include, but are not limited to, fast signal data base ("FSDB"), etc.

In some embodiments, glitch power estimation process 10 may be configured to receive information from compute engine 406 and generate a power estimate derived from switching information at partial glitch calculator 408. Partial glitch calculator 408 may generate one or more data files such as the ppfdata file shown in FIG. 4 The data files may provide information at every timestep and lump together thousands or millions of nets into one. Typically, a VCD file may include millions of timesteps and hundreds of millions of nets. In contrast, a ppfdata file might only have 100-1000 groups of nets at each timestep. In order to obtain a power number for each group of nets, glitch power estimation process 10 may weigh each net by the energy per toggle, and add up the energy for all the nets in that group. Compute engine 406 may also perform this function. The ppfdata file may provide power peak information, and then generate output files for the windows that interest the user, which may allow more accurate power estimation in a different tool (e.g., EDA application 20).

In some embodiments, glitch power estimation process 10 may include a Markov model generation module 410. As used herein, a "node" may refer to anything in the circuit/netlist that needs its activity calculated. Typically, this may be a net, but it may also be a pin of a gate, etc. Those two things may be similar as each pin connects to a net, so it may be possible to calculate one and infer the other. Examples of particular models are depicts in FIGS. 8-9. Additional information regarding the use of Markov chains and their use in power estimation for digital circuits may be found in U.S. Pat. Nos. 7,630,851, 7,539,958, and 7,222,039, each of which is incorporated herein by reference in their entirety. In operation, while compute engine 406 is generating the waveform for each net internally, the time region may be divided into one or more user-specified windows. Any size may be used in accordance with the present disclosure, however, 100 ns may be used by way of example. In that window, glitch power estimation process 10 may determine the fraction of time that the net was at logic "1" ($p_{hi}$) and the number of cycles in which it switched ($p_{sw}$). Glitch power estimation process 10 may determine a number that represents the expected number of glitches per cycle ($p_{gl}$). For example, if $p_{gl}$=0.1, we would expect one glitch transition every 10 cycles; if $p_{gl}$=5, we would expect five glitch transitions, on average, in every cycle. It's possible to use windows that are a single cycle long, however the best speed-accurate tradeoff may be in windows that are hundreds or thousands of cycles long.

In some embodiments, compute engine 406 may use the fact that there are 64 bits in each machine word to perform 64 timesteps at once, as such, it should be at least 64× faster than simulation. However, any reference herein to the number of bits is merely provided by way of example as the teachings of the present disclosure is not limited to these examples. Embodiments included herein may also be perfectly parallelized across tens or hundreds of machines and/or threads. Each glitch window is a few hundreds of cycles long, so glitch power estimation process 10 only approximately doubles the time to create a ppfdata file. If a gate is driven by flops (no glitching), glitch power estimation process 10 may create a simple {0, 1} Markov model for each input that matches the $p_{hi}$ and $p_{sw}$ for that input.

Using Markov methods, glitch power estimation process 10 may calculate the probability that there is 0, 1, 2, . . . glitches on the output, and determine a weighted sum of all of these, thus resulting in the expected number of glitches, $p_{gl}$. As glitch power estimation process 10 may traverse the netlist from left to right, the process may use a more complex (but similar) method to turn the $p_{hi}$, $p_{sw}$ and $p_{gl}$ at each input into a Markov model, calculate an output Markov model using the function table for that gate, and then convert that back into a $p_{gl}$ number. In this way, glitch power estimation process 10 may propagate values of $p_{gl}$ left-to-right through the netlist.

In some embodiments, glitch power estimation process 10 may be configured to receive an output from Markov model generation module 410 and to generate one or more partial transitions at partial transition module 412. The phrase "partial glitch transition", as used herein, may indicate that the $p_{gl}$ might not be an integer.

For example, and assuming a cycle time of 1 ns, at this stage, the calculation may be as follows:

Between t=0 ns and t=99 ns inclusive (i.e., 100 ns window), node X has a $p_{gl}$ of 0.037

In some embodiments, the data from compute engine 406 may indicate that it toggled 10 times. This means that we believe that point X, including glitching, switched about 10+100*0.037=13.7 times.

In some embodiments, and depending on the output file, this result may require some manipulation. For example, SAIF files (and similar files) only allow integral numbers of switches in windows. As such, the process may round up this node to 14, and then round down other nodes in order to keep the average correct. This is similar to the error diffusion techniques used in image processing. The process may spread the errors in space (to other nodes) and in time (to other windows). The ppfdata file has better time granularity but worse spatial granularity, so the process may make different but similar tradeoffs, moving partial switches to other times and/or nodes in the same group of nets. In some embodiments, different output methods and visualizations may have different time and space granularity, and as such may require different rounding approaches, for example, the ppfdata file format, etc. However, a thermal simulation may require different rounding. The output from partial transition module 412 may be provided to partial glitch calculator 408 where the partial glitch transitions may be calculated with the toggle count. As shown in FIG. 4, embodiments of the present disclosure are not limited to the ppfdata or SAIF data described herein. In some embodiments, "ppfdata" may indicate anything where there has been compression in space but not time, and "SAIF" may indicate anything that has been compressed in time but not space. It should be noted that embodiments included herein may apply to any combination of time and space consolidation on the output.

Figure 5:
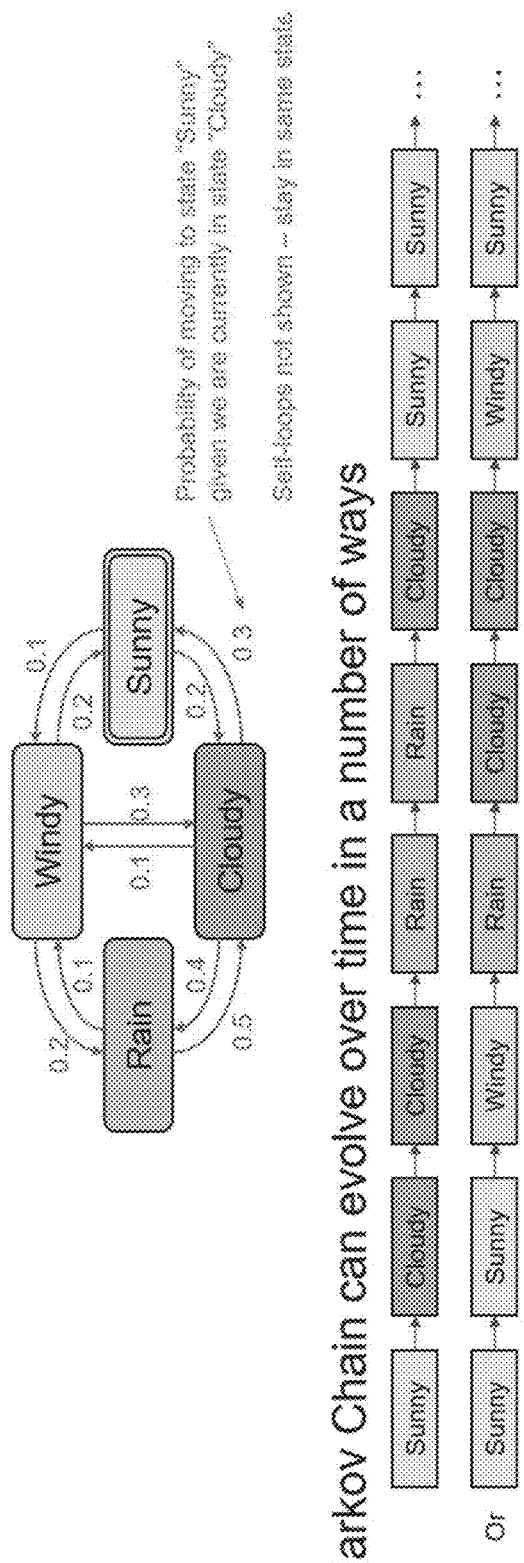
FIG. 5 is a diagram showing an example of a Markov chain according to an embodiment of the present disclosure.
Figure 6:
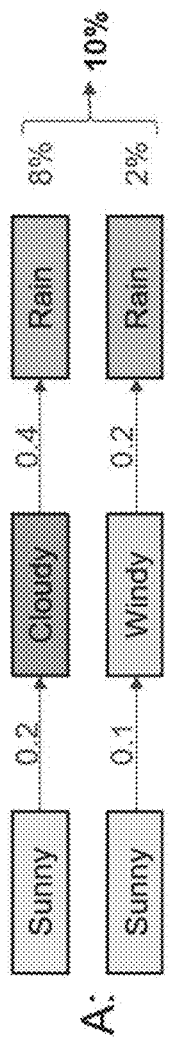
FIG. 6 is a diagram showing an example of a Markov chain according to an embodiment of the present disclosure.

Referring now to FIG. 5, a diagram 500 showing an example Markov chain is provided. A Markov chain may include a graph with initial state, and transition probabilities between states. Probabilities only depend on the current state—not previous states, or outside information. Continuous time chains exist, but only discrete time chains used here. One particular example used is in weather prediction as is shown in FIG. 6. Markov chains have a simple formulation, but have good predictive properties in many situations. Text generation and analysis, stock price trends, speech recognition, genetics, disease modeling, population dynamics, bioinformatics etc. Higher-order Markov models allow more complex behavior with the same theory.

Figure 7:
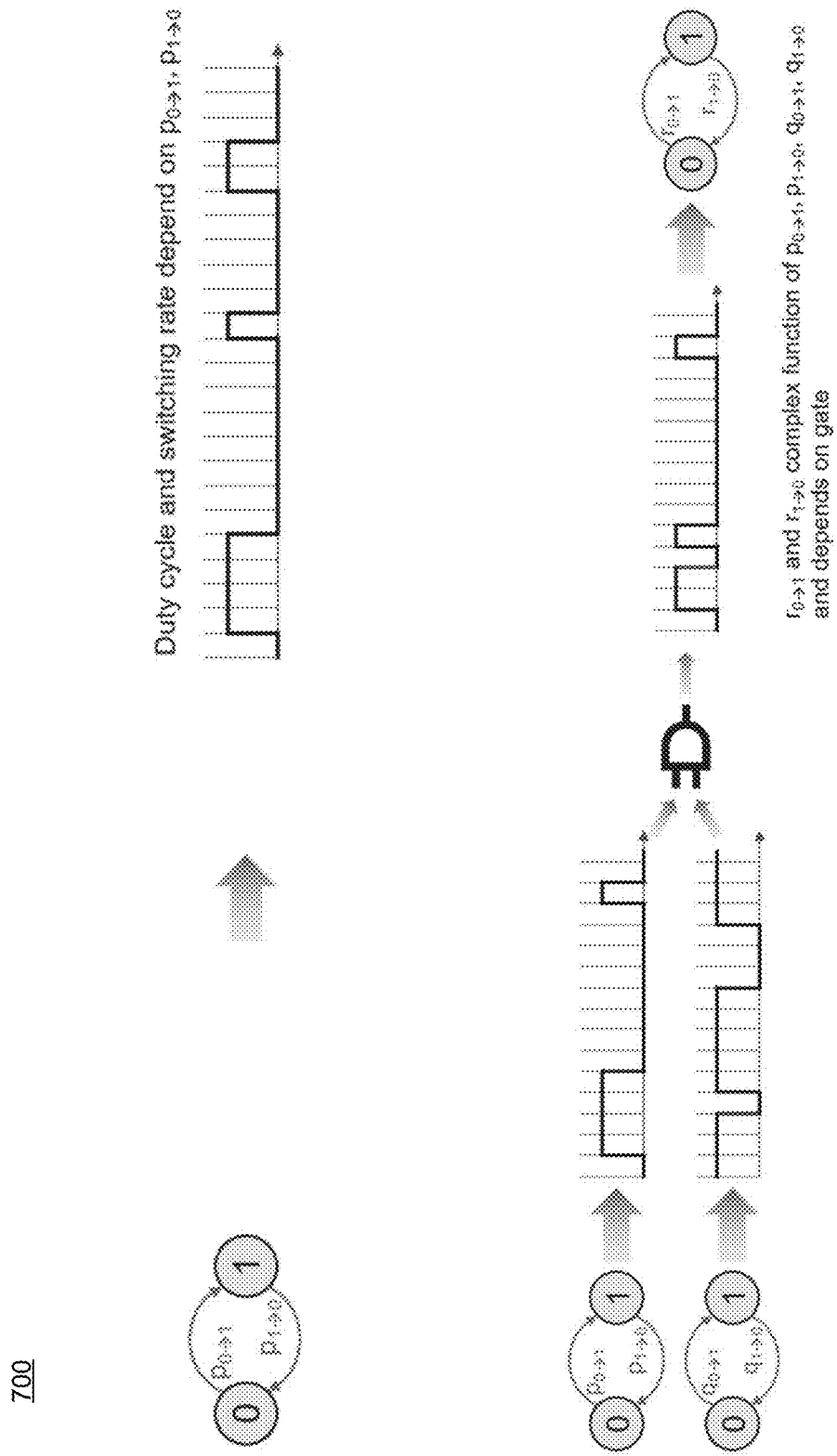
FIG. 7 is a diagram showing an example of a glitch estimation process according to an embodiment of the present disclosure.

Referring now to FIG. 7, examples showing the use of Markov models for power are provided. As shown in the top figure, the chain may generate a waveform with a given duty cycle and switching rate. The bottom two images in FIG. 7 show the output of a logic gate driven by Markov sources is also a Markov model. In operation, these may propagate switching/duty cycle through a netlist using the Markov Model. The process may develop closed-form formulae for each different gate type, based on a Karnaugh Map or other suitable approach. The switching/duty cycle may be turned directly into power. Use transition and state-dependent information in liberty/caps in standard parasitic exchange format ("SPEF"). This may also apply to an arbitrary logic function. Reconvergence may break independence between inputs and reconvergence may be handled by grouping many logic gates together and using an algorithm on larger functional blocks.

Figure 8:
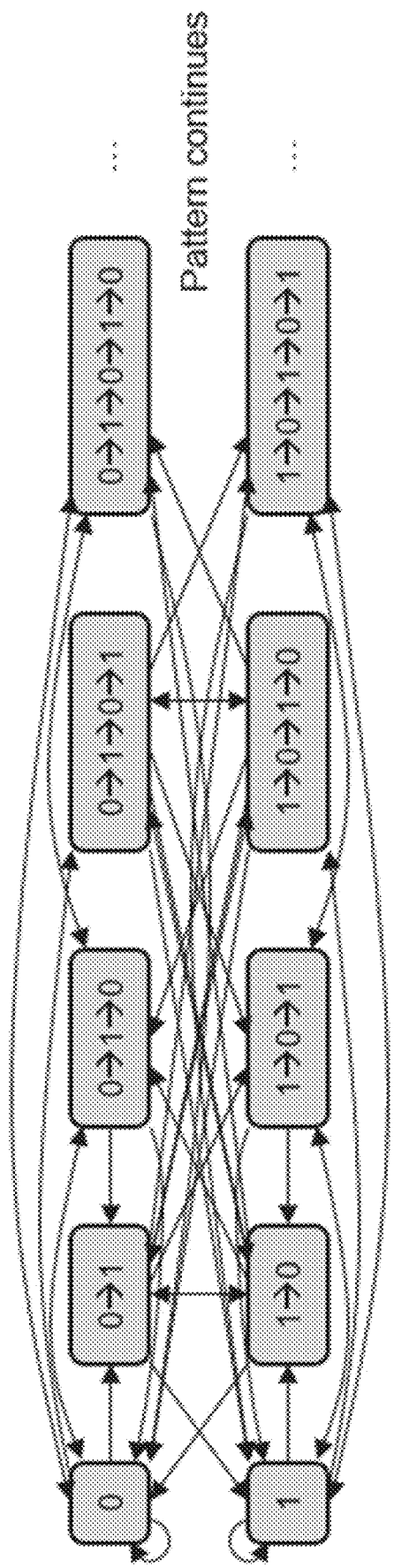
FIG. 8 is a diagram showing an example of a glitch estimation process according to an embodiment of the present disclosure.

Referring now to FIG. 8, a diagram 800 showing an example using Markov models for glitch power is provided. Here, a Markov Chain may be extended for node switching with glitch information. In some embodiments, switching and duty cycle information may be available from the emulation process. Embodiments included herein provide a hybrid approach including the stochastic glitch information provided above, but including an accurate switch/duty cycle.

Figure 9:
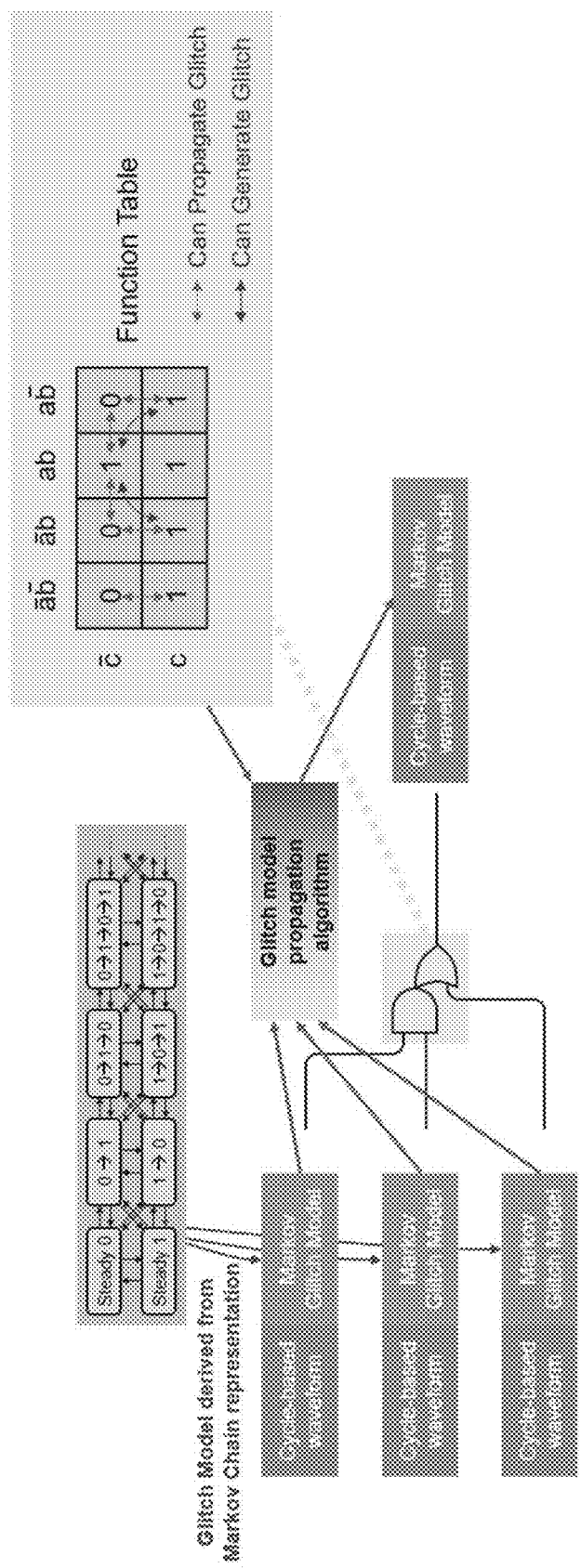
FIG. 9 is a diagram showing examples of Markov models consistent with a glitch estimation process according to an embodiment of the present disclosure.

Referring now to FIG. 9, a diagram 900 showing another example using Markov models for glitch power is provided. Embodiments of glitch power estimation process 10 may utilize one or more stochastic models to estimate glitch power. The process may use accurate switching/duty cycle information to calculate switching power.

Figure 10:
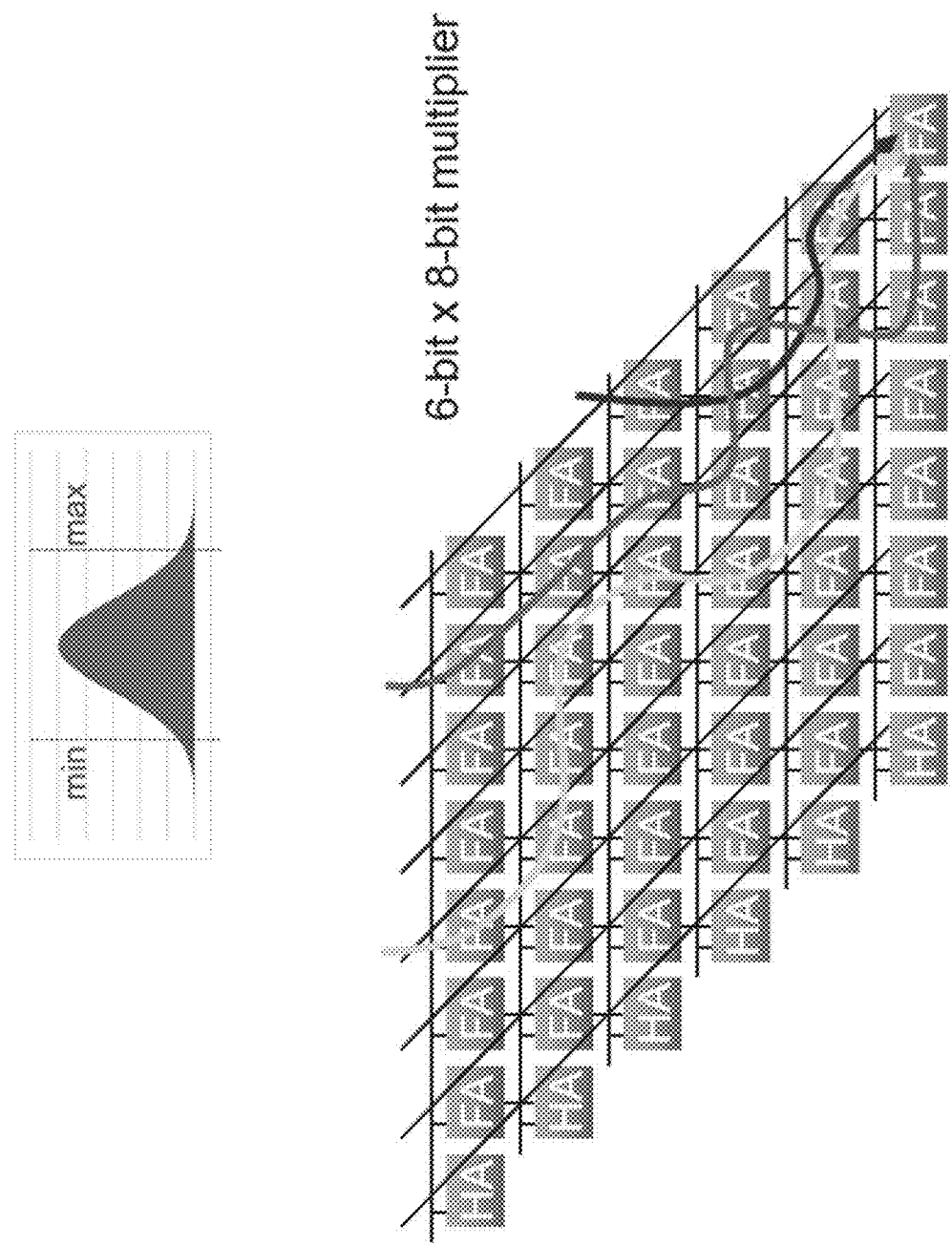
FIG. 10 shows an example graph of gate delay as well as a 6-bit by 8-bit multiplier according to an embodiment of the present disclosure.

Referring now to FIG. 10, a diagram 1000 showing an example of gate delay associated with a 6-bit by 8-bit multiplier is provided. Static timing analysis ("STA") may be optimized for worst-case (setup) or best-case (hold) delays. Actual gate delay on silicon is a probability distribution over a range. Cycle-to-cycle glitch edges for highly glitchy circuits (e.g., multipliers) may take different paths on different cycles. Crosstalk and supply voltage may both have effectively random components. Predicting actual glitch edges on silicon is almost impossible, however, a stochastic approach provides good bounds on where glitches highly likely to be significant.

Embodiments of glitch power estimation process 10 may be applied to power estimation algorithms inside an emulator to account for glitch power. Effectively, the process may be configured to analyze the duty cycle and switching probabilities in a netlist during waveform reconstruction in emulation, and use a statistical model to determine glitch activity. This can then be added to our "ppfdata" output (e.g., cycle-by-cycle, but summed for entire modules) or SAIF/ toggle count format ("TCF") (e.g., per-node, but over many cycles).

Embodiments of glitch power estimation process 10 may generate a formula at every gate that gives the expected number of glitch edges (a floating-point value) based on the duty cycle, switch probability, and glitch estimation of all input wires. This may propagate through the netlist, then assemble the data in the right way to get it to the particular output file type (for ppfdata, dither across nodes, and for SAIF/TCF, dither across time).

It will be apparent to those skilled in the art that various modifications and variations can be made in the embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A computer-implemented method for estimating glitch power associated with an emulation process comprising:
   accessing, using a processor, information associated with an electronic design database;
   generating cycle accurate waveform information at each node of a netlist based upon, at least in part, a portion of the electronic design database;
   generating a probability-based glitch model for a plurality of inputs associated with the netlist, wherein generating the probability-based model includes generating the probability-based model in one or more user specified windows;
   determining one or more partial glitch transitions from each probability-based model; and
   combining the one or more partial glitch transitions with the cycle accurate waveform information to obtain a glitch power estimation.

2. The method of claim 1, further comprising:
   receiving one or more electronic design files.

3. The method of claim 2, further comprising:
   generating, a power estimate derived from switching information based upon, at least in part, the one or more electronic design files.

4. The method of claim 1, wherein the one or more partial glitch transitions are stochastically derived.

5. The method of claim 1, further comprising:
   converting at least a portion of the information associated with the electronic design database into one or more output files.

6. The method claim 5, wherein the one or more output files includes switching activity information.

7. A non-transitory computer readable medium having stored thereon instructions for estimating glitch power associated with an emulation process, the instructions when executed by a processor resulting in one or more operations, the operations comprising:
   accessing, using a processor, information associated with an electronic design database;
   generating cycle accurate waveform information at each node of a netlist based upon, at least in part, a portion of the electronic design database;
   generating a Markov glitch model for a plurality of inputs associated with the netlist;
   receiving an electronic design parasitic data file;
   calculating a power estimate derived from switching information based upon, at least in part, the electronic design parasitic file;
   determining one or more partial glitch transitions from each Markov glitch model; and
   combining the one or more partial glitch transitions with the cycle accurate waveform information to obtain a glitch power estimation across a plurality of electronic design layouts.

8. The non-transitory computer readable medium of claim 7, further comprising:
   receiving a plurality of layout electronic design files.

9. The non-transitory computer readable medium of claim 8, further comprising:
   wherein the power estimate derived from switching information is used to obtain a power number for each of a plurality of groups of nets associated with the electronic design.

10. The non-transitory computer readable medium of claim 7, wherein generating the Markov glitch model includes generating the Markov glitch model in one or more user specified windows.

11. The non-transitory computer readable medium of claim 7, wherein the one or more partial glitch transitions are stochastically derived.

12. The non-transitory computer readable medium of claim 7, further comprising:
   converting at least a portion of the information associated with the electronic design database into one or more output files.

13. The non-transitory computer readable medium claim 12, wherein the one or more output files includes switching activity information.

14. A system for estimating glitch power associated with an emulation process comprising:
   an electronic design database; and
   at least one processor configured to access information associated with the electronic design database, the at least one processor further configured to generate cycle accurate waveform information at each node of a netlist based upon, at least in part, a portion of the electronic design database, the at least one processor further configured to generate a probability-based glitch model for a plurality of inputs associated with the netlist and to determine one or more partial glitch transitions from each probability-based model, wherein generating the probability-based model includes generating the probability-based model in one or more user specified windows, the at least one processor further configured to combine the one or more partial glitch transitions with the cycle accurate waveform information to obtain a glitch power estimation.

15. The system of claim 14, wherein the at least one processor is further configured to access one or more electronic design files.

16. The system of claim 15, wherein the at least one processor is further configured to generate, a power estimate derived from switching information based upon, at least in part, the one or more electronic design files.

17. The system of claim 14, wherein the one or more partial glitch transitions are stochastically derived.

18. The system of claim 14, wherein the at least one processor is further configured to convert at least a portion of the information associated with the electronic design database into one or more output files.

* * * * *